United States Patent
Sumiya et al.

(10) Patent No.: US 8,784,767 B2
(45) Date of Patent: Jul. 22, 2014

(54) POLYCRYSTALLINE DIAMOND AND METHOD OF MANUFACTURING THE SAME

(75) Inventors: Hitoshi Sumiya, Itami (JP); Katsuko Yamamoto, Itami (JP); Takeshi Sato, Itami (JP); Keiko Arimoto, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/517,921

(22) PCT Filed: Aug. 10, 2011

(86) PCT No.: PCT/JP2011/068279
§ 371 (c)(1), (2), (4) Date: Jun. 20, 2012

(87) PCT Pub. No.: WO2012/023473
PCT Pub. Date: Feb. 23, 2012

(65) Prior Publication Data
US 2012/0258035 A1   Oct. 11, 2012

(30) Foreign Application Priority Data

Aug. 19, 2010   (JP) ................................ 2010-184187

(51) Int. Cl.

| | | |
|---|---|---|
| B01J 3/06 | (2006.01) | |
| B26D 3/08 | (2006.01) | |
| B31B 1/25 | (2006.01) | |
| B26D 11/00 | (2006.01) | |
| B24B 21/18 | (2006.01) | |
| B23F 21/03 | (2006.01) | |
| B21C 3/00 | (2006.01) | |
| B23H 7/00 | (2006.01) | |
| A62C 31/02 | (2006.01) | |
| B32B 7/02 | (2006.01) | |
| G11B 5/64 | (2006.01) | |

(52) U.S. Cl.
USPC .............. 423/446; 83/879; 83/886; 83/863; 451/443; 451/548; 72/467; 219/69.12; 239/589; 428/216; 428/336

(58) Field of Classification Search
None
See application file for complete search history.

(56) References Cited

U.S. PATENT DOCUMENTS

| | | | |
|---|---|---|---|
| 3,401,019 A | 9/1968 | Cowan et al. | |
| 3,488,153 A * | 1/1970 | Bundy | 423/446 |
| 2005/0209490 A1* | 9/2005 | Dahl et al. | 585/21 |
| 2005/0210755 A1* | 9/2005 | Cho et al. | 51/293 |
| 2009/0305039 A1 | 12/2009 | Sumiya | |
| 2012/0009402 A1* | 1/2012 | Johansson et al. | 428/216 |

FOREIGN PATENT DOCUMENTS

| | | |
|---|---|---|
| GB | 1115648 A | 5/1968 |
| JP | 2007-055819 | 3/2007 |
| JP | 2009-007248 | 1/2009 |
| JP | 2009-067609 | 4/2009 |
| JP | 2009-067610 | 4/2009 |

OTHER PUBLICATIONS

Sumiya et al.; Microstructure and Mechanical Properties of High-Hardness Nano-Polycrystalline Diamonds; SEI Technical Review; No. 66; Apr. 2008.*
Bundy, "Direct Conversion of Graphite to Diamond in Static Pressure Apparatus," The Journal of Chemical Physics, vol. 38, No. 3, pp. 631-643 (Feb. 1, 1963).
Waketsuki et al., "Notes on Compressible Gasket and Bridgman-Anvil Type High Pressure Apparatus," Japanese Journal of Applied Physics, vol .11, No. 4, pp. 578-590 (Apr. 1972).
Naka et al., "Direct Conversion of Graphite to Diamond Under Static Pressure," Nature, vol. 259, pp. 38-39 (Jan. 1 & 8, 1976).
Irifune et al., "Nature of Polycrystalline Diamond Synthesized by Direct Conversion of Graphite Using Kawai-Type Multianvil Apparatus," New Diamond and Frontier Carbon Technology, vol. 14, No. 5 pp. 313-327 (2004).
Sumiya et al., "Synthesis of High-purity Nano-Polycrystalline Diamond and its Characterization," SEI Technical Review, vol. 165, pp. 68-74, (Sep. 2004).
Office Action in Chinese Patent Application No. 201180005940.4, dated Jun. 19, 2013.
Tetsuo Irifune et al., "Formation of pure polycrystalline diamond by direct conversion of graphite at high pressure and high temperature," Physics of the Earth and Planetary Interiors 143-144, pp. 593-600 (2004).
Extended European Search Report issued in European Patent Application No. 11818115.5 dated May 16, 2014.
Sumiya H. et al., "Conditions and mechanism of formation of nano-polysrystalline diamonds on direct transformation from graphite and non-graphitic carbon at high pressure and temperature," High Pressure Research, vol. 26, No. 2, Jun. 2006, pp. 63-69.

* cited by examiner

*Primary Examiner* — Guinever Gregorio
(74) *Attorney, Agent, or Firm* — Venable LLP; Michael A. Sartori; Tamatane J. Aga

(57) ABSTRACT

Polycrystalline diamond includes cubic diamond and hexagonal diamond, and a ratio of X-ray diffraction peak intensity of a (100) plane of the hexagonal diamond to X-ray diffraction peak intensity for a (111) plane of cubic diamond is not lower than 0.01%. In addition, a present method of manufacturing polycrystalline diamond includes the steps of preparing a non-diamond carbon material having a degree of graphitization not higher than 0.58 and directly converting the non-diamond carbon material to cubic diamond and hexagonal diamond and sintering the non-diamond carbon material, without adding any of a sintering agent and a binder, under pressure and temperature conditions at which diamond is thermodynamically stable.

14 Claims, No Drawings

POLYCRYSTALLINE DIAMOND AND METHOD OF MANUFACTURING THE SAME

TECHNICAL FIELD

The present invention relates to polycrystalline diamond and a method of manufacturing the same, and particularly to polycrystalline diamond having high hardness and high strength suitably used for such tools as a cutting bit, a dresser and a die as well as a drill bit, and a method of manufacturing the same.

BACKGROUND ART

For conventional polycrystalline diamond used for such tools as a cutting bit, a dresser and a die as well as a drill bit, an iron-group element metal such as Fe, Co and Ni, carbonate such as $CaCO_3$, and the like are employed as a sintering agent for promoting sintering of a source material, and ceramics such as SiC and the like are used as a binder for binding source materials.

Polycrystalline diamond above is obtained by sintering diamond powders, which are source materials, together with a sintering agent at a high-pressure and high-temperature condition (generally, the pressure being around 5 to 8 GPa and the temperature being around 1300 to 2200° C.) at which diamond is thermodynamically stable.

Polycrystalline diamond thus obtained contains the used sintering agent therein. Such a sintering agent has no small effects on such mechanical characteristics as hardness and strength and on heat resistance of polycrystalline diamond.

Polycrystalline diamond from which the sintering agent above has been removed by acid treatment and sintered diamond excellent in heat resistance for which heat-resistant SiC has been used as a binder have also been known, however, they are low in hardness and strength and insufficient in mechanical characteristics as a tool material.

Meanwhile, a non-diamond carbon material such as graphite, glassy carbon or amorphous carbon can directly be converted to diamond at an ultra-high pressure and temperature, without using a sintering agent or the like. By directly converting a non-diamond phase to a diamond phase and simultaneously carrying out sintering, polycrystalline single-phase diamond is obtained.

F. P. Bundy, J. Chem. Phys., 38 (1963) pp. 631-643 (NPL 1), M. Wakatsuki, K. Ichinose, T. Aoki, Japan. J. Appl. Phys., 11 (1972) pp. 578-590 (NPL 2), and S. Naka, K. Horii, Y. Takeda, T. Hanawa, Nature, 259 (1976) p. 38 (NPL3) disclose polycrystalline diamond obtained by direct conversion of graphite serving as a source material at such an ultra-high pressure from 14 GPa to 18 GPa and an ultra-high temperature of 3000K or higher.

Each polycrystalline diamond above, however, is produced by direct electrical heating in which a conductive non-diamond carbon material such as graphite is heated by directly feeding a current therethrough, and hence unconverted graphite inevitably remains. In addition, a particle size of diamond is non-uniform and sintering tends to be partially insufficient. Therefore, such mechanical characteristics as hardness and strength are not sufficiently high and only a piece-like polycrystal is obtained, and hence practical use has not been achieved.

T. Irifune, H. Sumiya, "New Diamond and Frontier Carbon Technology," 14 (2004) p. 313 (NPL 4) and Sumiya, Irifune, SEI Technical Review, 165 (2004) p. 68 (NPL 5) disclose a method of obtaining dense and high-purity polycrystalline diamond by direct conversion and sintering by indirect heating at an ultra-high pressure not lower than 12 GPa and an ultra-high temperature not lower than 2200° C., with the use of high-purity, highly-crystalline graphite as a starting material. Though diamond obtained with this method has very high hardness, its practical characteristics such as wear resistance, chipping resistance, and resistance to crack propagation have been insufficient and unstable.

Naturally produced polycrystalline diamonds (carbonado, ballas and the like) have also been known and some are used for a drill bit. On the other hand, variation in material is great and yield is also small, and thus they are not much industrially used.

Depending on some applications, single-crystal diamond is used. Use thereof, however, is limited to use for an ultra sophisticated tool or a precision wear-resistant tool due to restrictions in terms of dimension and cost, and thus applications and conditions for use are restricted by cleavability and anisotropy in mechanical characteristics of single-crystal diamond.

CITATION LIST

Non Patent Literature

NPL 1: F. P. Bundy, J. Chem. Phys., 38 (1963) pp. 631-643

NPL 2: M. Wakatsuki, K. Ichinose, T. Aoki, Japan. J. Appl. Phys., 11 (1972) pp. 578-590

NPL 3: S. Naka, K. Horii, Y. Takeda, T. Hanawa, Nature, 259 (1976) p. 38

NPL 4: T. Irifune, H. Sumiya, "New Diamond and Frontier Carbon Technology," 14 (2004) p. 313

NPL 5: Sumiya, Irifune, SEI Technical Review, 165 (2004) p. 68

SUMMARY OF INVENTION

Technical Problem

The present invention was made to solve the problems in the conventional art above, and an object thereof is to provide polycrystalline diamond having high hardness and high strength, to suitably be used as such a tool as a cutting bit, a dresser and a die as well as a drill bit and a method of manufacturing the same.

Solution to Problem

The present invention was completed by finding that polycrystalline diamond including cubic diamond and hexagonal diamond at a ratio of hexagonal diamond to cubic diamond being within a prescribed range is higher in hardness and strength than polycrystalline diamond having a ratio above of hexagonal diamond to cubic diamond out of the prescribed range.

Namely, the present invention is directed to polycrystalline diamond including cubic diamond and hexagonal diamond, a ratio of X-ray diffraction peak intensity of a (100) plane of the hexagonal diamond to X-ray diffraction peak intensity for a (111) plane of the cubic diamond (an h/c ratio) being not lower than 0.01%.

In addition, the present invention was completed by finding that polycrystalline diamond having the h/c ratio above in the prescribed range above is manufactured by directly sintering a non-diamond carbon material having a degree of graphitization not higher than a prescribed value, without adding any of a sintering agent and a binder, under pressure and temperature conditions at which diamond is thermodynamically stable.

Namely, the present invention is directed to a method of manufacturing polycrystalline diamond including the steps of preparing a non-diamond carbon material having a degree of graphitization not higher than 0.58 and directly converting the non-diamond carbon material into cubic diamond and hexagonal diamond and sintering the non-diamond carbon material, without adding any of a sintering agent and a binder, under pressure and temperature conditions at which diamond is thermodynamically stable.

Advantageous Effects of Invention

As described above, the present invention provides polycrystalline diamond having high hardness and high strength, to suitably be used as such a tool as a cutting bit, a dresser and a die as well as a drill bit and a method of manufacturing the same.

DESCRIPTION OF EMBODIMENTS

First Embodiment

Polycrystalline diamond according to one embodiment of the present invention includes cubic diamond (hereinafter referred to as c-diamond) and hexagonal diamond (hereinafter referred to as h-diamond), and a ratio of X-ray diffraction peak intensity of a (100) plane of h-diamond to X-ray diffraction peak intensity for a (111) plane of c-diamond (hereinafter referred to as an h/c ratio) is not lower than 0.01%.

The polycrystalline diamond in the present embodiment having the h/c ratio not lower than 0.01% is higher in hardness and strength than polycrystalline diamond not containing h-diamond (that is, having the h/c ratio of 0%) or polycrystalline diamond having the h/c ratio lower than 0.01%, and it is specifically higher in strength, rupture strength, wear resistance, and the like.

Here, c-diamond refers to diamond of which crystal structure is cubic, and h-diamond refers to diamond of which crystal structure is hexagonal. C-diamond and h-diamond are distinguished from each other based on a pattern of a diffraction peak determined by X-ray diffraction. Namely, in X-ray diffraction of polycrystalline diamond containing c-diamond and h-diamond, a pattern in which a pattern of a diffraction peak of c-diamond and a pattern of a diffraction peak of h-diamond are mixed is obtained. In the present application, a ratio of h-diamond to c-diamond is expressed by an h/c ratio, which is a ratio of X-ray diffraction peak intensity of the (100) plane of h-diamond to X-ray diffraction peak intensity for the (111) plane of c-diamond.

Second Embodiment

A method of manufacturing polycrystalline diamond according to another embodiment of the present invention includes the steps of preparing a non-diamond carbon material having a degree of graphitization not higher than 0.58 and directly converting this non-diamond carbon material into cubic diamond and hexagonal diamond and sintering the non-diamond carbon material, without adding any of a sintering agent and a binder, under pressure and temperature conditions at which diamond is thermodynamically stable.

According to the method of manufacturing polycrystalline diamond in the present embodiment, polycrystalline diamond high in hardness and strength (specifically, strength, transverse strength, wear resistance, and the like) including c-diamond (cubic diamond) and h-diamond (hexagonal diamond) and having the h/c ratio (a ratio of X-ray diffraction peak intensity of the (100) plane of h-diamond to X-ray diffraction peak intensity for the (111) plane of c-diamond) not lower than 0.01% is obtained.

(Step of Preparing Non-Diamond Carbon Material)

The method of manufacturing polycrystalline diamond in the present embodiment initially includes the step of preparing a non-diamond carbon material having a degree of graphitization not higher than 0.58. A non-diamond carbon material prepared in the present preparation step is not particularly restricted so long as it has a degree of graphitization not higher than 0.58 and it is a carbon material other than diamond. Graphite low in degree of graphitization such as pulverized graphite, an amorphous carbon material such as amorphous carbon and glassy carbon, or a mixture thereof may be applicable.

Here, a degree of graphitization P of a non-diamond carbon material is found as follows. As a result of X-ray diffraction of a non-diamond carbon material, an interplanar spacing $d_{002}$ of a (002) plane of graphite representing a non-diamond carbon material is measured and a ratio p of a turbostratic structure portion of the non-diamond carbon material is calculated based on Equation (1) below.

$$d_{002}=3.440-0.086\times(1-p^2) \qquad (1)$$

Degree of graphitization P is calculated from ratio p of the turbostratic structure portion thus obtained, based on Equation (2) below.

$$P=1-p \qquad (2)$$

From a point of view of suppression of growth of a crystal grain, a non-diamond carbon material preferably does not contain an iron-group element metal representing an impurity. In addition, from a point of view of suppression of growth of a crystal grain and promoted conversion to diamond, content of hydrogen (H), oxygen (O) or the like representing an impurity is preferably low.

(Step of Converting Non-Diamond Carbon Material to c-Diamond and h-Diamond and Sintering Non-Diamond Carbon Material)

The method of manufacturing polycrystalline diamond in the present embodiment then includes the step of directly converting the non-diamond carbon material above to cubic diamond and hexagonal diamond and sintering the non-diamond carbon material, without adding any of a sintering agent and a binder, under pressure and temperature conditions at which diamond is thermodynamically stable.

By placing the non-diamond carbon material above under pressure and temperature conditions at which diamond is thermodynamically stable without adding any of a sintering agent and a binder, the non-diamond carbon material is directly converted to c-diamond and h-diamond and sintered, and thus polycrystalline diamond high in hardness and strength having the h/c ratio not lower than 0.01% is obtained.

Here, the sintering agent refers to a catalyst promoting sintering of a material serving as a source material, and an iron-group element metal such as Co, Ni and Fe, carbonate such as $CaCO_3$, and the like are exemplified. A binder refers to a material for binding materials serving as source materials, and ceramics such as SiC is exemplified.

Pressure and temperature conditions at which diamond is thermodynamically stable refer to such pressure and temperature conditions that a diamond phase is a thermodynamically stable phase in a carbon-based material. Such conditions that sintering can be carried out without adding any of a sintering agent and a binder specifically refer to such conditions as a pressure not lower than 12 GPa and a temperature from 2000° C. to 2600° C. and preferably a pressure not lower than 16 GPa and a temperature from 2200° C. to 2300° C.

A high-pressure and high-temperature generation apparatus used in the method of manufacturing polycrystalline diamond in the present embodiment is not particularly restricted so long as it is an apparatus capable of attaining pressure and temperature conditions at which a diamond phase is a thermodynamically stable phase, however, from a point of view of enhanced productivity and operability, a belt type or a multi-anvil type is preferred. Further, a vessel accommodating a non-diamond carbon material which is a source material is not particularly restricted so long as it is made of a material resistant to high pressure and high temperature, and for example, Ta or the like is suitably used.

EXAMPLES

Examples 1 to 6, Comparative Examples 1 to 2

As shown in Table 1, a plurality of graphite powders different in degree of graphitization and particle size were prepared as non-diamond carbon materials.

Then, each of the plurality of non-diamond carbon materials above was subjected to high-pressure and high-temperature treatment under such conditions as a pressure of 16 GPa and a temperature of 2200° C. (that were a pressure and a temperature at which diamond was thermodynamically stable), without adding any of a sintering agent and a binder, using a high pressure and high temperature generation apparatus.

Hardness, transverse strength, and wear resistance of each of the plurality of obtained polycrystalline diamonds were evaluated. Hardness is Knoop hardness measured with the use of a Knoop hardness meter, under such a condition that load of 4.9 N was applied for 10 seconds. Transverse strength was measured with a three-point bending strength tester. Wear resistance was measured with a diamond grinder under such a condition that a load was set to 3 kg/mm$^2$, and it was shown with a value relative to a value in Example 1 being defined as 1.0. Here, a higher relative value indicates higher wear resistance. Table 1 summarizes the results.

TABLE 1

| | Non-Diamond Carbon Material | | | Polycrystalline Diamond | | |
|---|---|---|---|---|---|---|
| | Degree of Graphitization | Particle Size (nm) | h/c Ratio (%) | Knoop Hardness (GPa) | Transverse Strength (kg/mm$^2$) | Wear Resistance (Relative Value) |
| Example 1 | 0.39 | 150 | 0.5 | 130 | 330 | 1.0 |
| Example 2 | 0.43 | 135 | 0.3 | 140 | 330 | 1.05 |
| Example 3 | 0.46 | 160 | 0.2 | 139 | 310 | 1.15 |
| Example 4 | 0.54 | 205 | 0.1 | 138 | 310 | 1.1 |
| Example 5 | 0.56 | 203 | 0.03 | 128 | 290 | 0.95 |
| Example 6 | 0.58 | 210 | 0.01 | 135 | 260 | 1.0 |
| Comparative Example 1 | 0.59 | 260 | <0.01 | 124 | 220 | 0.7 |
| Comparative Example 2 | 0.65 | 370 | <0.01 | 129 | 200 | 0.75 |

Referring to Table 1, it was found that the polycrystalline diamonds (Examples 1 to 6) having the We ratio not lower than 0.01% were higher in all of hardness, transverse strength, and wear resistance than the polycrystalline diamonds (Comparative Examples 1 to 2) having the h/c ratio lower than 0.01% and that they had excellent strength characteristics and wear resistance.

In addition, rupture strength and hardness of samples in Examples 1, 3, 6 and samples in Comparative Examples 1, 2 at a high temperature were evaluated. Each measurement was conducted in an Argon current. Table 2 summarizes the results.

TABLE 2

| | Bending Strength (kg/mm$^2$) | | | | Knoop Hardness (GPa) | | |
|---|---|---|---|---|---|---|---|
| | 25° C. | 800° C. | 1000° C. | 1200° C. | 25° C. | 600° C. | 800° C. |
| Example 1 | 330 | 320 | 330 | 340 | 130 | 122 | 117 |
| Example 3 | 310 | 310 | 300 | 330 | 139 | 131 | 126 |
| Example 6 | 260 | 260 | 250 | 260 | 135 | 122 | 121 |
| Comparative Example 1 | 220 | 220 | 210 | 190 | 124 | 121 | 96 |
| Comparative Example 2 | 200 | 190 | 185 | 165 | 129 | 108 | 91 |

With reference to these results, the polycrystalline diamonds having the h/c ratio not lower than 0.01% (Examples 1, 3, 6) achieved high rupture strength and hardness even at a high temperature and their rate of lowering with temperature increase was smaller than that of the polycrystalline diamonds (Comparative Examples 1, 2) having the h/c ratio lower than 0.01%. Rupture strength in a temperature range not lower than 800° C. and not higher than 1200° C. of the former (Examples 1, 3, 6) does not decrease by 10% or more from the value at room temperature (25° C.), and hardness at 800° C. does not decrease by 20% or more as compared with a value at room temperature (25° C.). In addition, rupture strength at 1200° C. in Examples 1, 3, 6 is higher than rupture strength at room temperature (25° C.).

Example 7

The polycrystalline diamond obtained in each of Examples 1 to 6 and Comparative Examples 1 to 2 above was brazed to a shank made of metal, and a scribe tool having 4 points at a tip end (having a quadrangular plane) was fabricated. Each fabricated scribe tool was used to form 200 50 mm-long scribe grooves in a sapphire substrate at a load of 20 g. Thereafter, an amount of wear of the polycrystalline diamond at the tip end portion of each scribe tool was observed with an electron microscope. Then, the amount of wear of the scribe tool made of the polycrystalline diamonds according to Examples 1 to 6 was 0.80 time or less, as compared with that of the scribe tool made of the polycrystalline diamonds according to Comparative Examples 1 to 2.

Example 8

The polycrystalline diamond obtained in each of Examples 1 to 6 and Comparative Examples 1 to 2 above was buried in a shank made of metal, and a dresser having a single point at a tip end (having a conical shape) was fabricated. Each fabricated dresser was worn with a wet method by using a WA (white alumina) grindstone under such conditions as a peripheral speed of the grindstone of 30 m/second and a depth of cut of 0.05 mm. Thereafter, an amount of wear of each dresser was measured with a height gauge, and the amount of wear of the dresser made of the polycrystalline diamonds according to Examples 1 to 6 was 0.85 time or less, as compared with that of the dresser made of the polycrystalline diamonds according to Comparative Examples 1 to 2.

Example 9

The polycrystalline diamond obtained in each of Examples 1 to 6 and Comparative Examples 1 to 2 above was buried in a round frame made of metal, and a die having a hole diameter of $\phi$ 20 $\mu$m was fabricated. Each fabricated die was used for Cu wire drawing at a linear velocity of 500 m/minute. Here, a wire drawing time period until the hole diameter of the die made of the polycrystalline diamonds according to Examples 1 to 6 wore to $\phi$ 20.2 $\mu$m was 1.12 time or more, as compared with that of the die made of the polycrystalline diamonds according to Comparative Examples 1 to 2.

Example 10

The polycrystalline diamond obtained in each of Examples 1 to 6 and Comparative Examples 1 to 2 above was buried in a round frame made of metal, and an orifice having an orifice diameter of $\phi$ 200 $\mu$m, an orifice height of 5 mm, and arithmetic mean roughness Ra of an orifice surface of 290 nm was fabricated. Each fabricated orifice was used to form a waterjet nozzle having a water discharge pressure of 200 MPa, and performance in cutting a stainless plate having a thickness of 10 mm was evaluated. A time period, during which cutting could be carried out until the orifice diameter of the orifice made of the polycrystalline diamonds according to Examples 1 to 6 increased to $\phi$ 300 $\mu$m, was 1.15 time or more, as compared with that of the orifice made of the polycrystalline diamonds according to Comparative Examples 1 to 2.

Example 11

The polycrystalline diamond obtained in each of Examples 1 to 6 and Comparative Examples 1 to 2 above was brazed to a superhard base metal, and a cutting tool having a tip end angle of 90° and a tip end radius of curvature (R) of 100 nm was fabricated. Each fabricated cutting tool was used to work a metal plate obtained by nickel-plating a 30 mm-thick copper plate to a thickness of 20 $\mu$m, so as to form grooves having a depth of 5 $\mu$m at pitches of 5 $\mu$m. Here, a time period until the tip end of the cutting tool made of the polycrystalline diamonds according to Examples 1 to 6 wore by 1 $\mu$m was 1.30 time or more, as compared with that of the cutting tool made of the polycrystalline diamonds according to Comparative Examples 1 to 2.

Example 12

The polycrystalline diamond obtained in each of Examples 1 to 6 and Comparative Examples 1 to 2 above was brazed to a superhard shank, and a drill having a diameter of $\phi$ 1 mm and a blade length of 3 mm was fabricated. Each fabricated drill was used to drill a 1.0 mm-thick plate made of cemented carbide (WC—Co) under such conditions as revolutions of the drill of 400 rpm and a feed of 2 $\mu$m/time. The number of holes that could be drilled until the drill made of the polycrystalline diamonds according to Examples 1 to 6 was worn or broken was 1.20 time or more, as compared with that of the drill made of the polycrystalline diamonds according to Comparative Examples 1 to 2.

Example 13

The polycrystalline diamond obtained in each of Examples 1 to 6 and Comparative Examples 1 to 2 above was brazed to a superhard shank, and a disc-shaped grinding tool having a diameter of $\phi$ 3 mm and a grinding edge angle of 60° was fabricated. Each fabricated grinding tool was used to form a V-shaped groove in a surface made of cemented carbide (WC—Co) for a working time period of 2 hours under such conditions as revolutions of 4000 rpm and a depth of cut of 2 and an amount of wear of a grinding edge at that time was examined. The amount of wear of the grinding edge of the grinding tool made of the polycrystalline diamonds according to Examples 1 to 6 was 0.7 time or less, as compared with that of the grinding tool made of the polycrystalline diamonds according to Comparative Examples 1 to 2.

Example 14

The polycrystalline diamond obtained in each of Examples 1 to 6 and Comparative Examples 1 to 2 above was attached to a frame made of metal to thereby fabricate an electric discharge machining electrode guide. An electrode wire having a wire diameter of 70 $\mu$m was fed at a rate of 10 m/minute and an amount of wear of a guide hole portion after 100 hours was examined. The amount of wear of the drill made of the polycrystalline diamonds according to Examples 1 to 6 was 0.8 time or less, as compared with that of the drill made of the polycrystalline diamonds according to Comparative Examples 1 to 2.

Example 15

The polycrystalline diamond obtained in each of Examples 1 to 6 and Comparative Examples 1 to 2 above was used to fabricate a scribing wheel having a diameter of $\phi$ 3.5 and a thickness of 0.6 mm. Each fabricated scribing wheel was used to conduct a scribe test with the use of a ceramics substrate at a feed rate of 100 mm/second and a pressing load of 2.5 kg, and an amount of wear for 50 hours was examined. The amount of wear of the scribing wheel made of the polycrystalline diamonds according to Examples 1 to 6 was 0.75 time or less, as compared with that of the scribing wheel made of the polycrystalline diamonds according to Comparative Examples 1 to 2.

Referring to Examples 7 to 15 above, it was found that the polycrystalline diamond according to the present invention (Examples 1 to 6) had hardness, strength and wear resistance superbly better than the conventional polycrystalline diamond (Comparative Examples 1 to 2), and therefore it was very useful as a material for a scribe tool, a dresser, a die, an orifice, a cutting tool, a rotary cutting tool such as a drill or an end mill, a grinding tool, an electrode guide, and a scribing wheel.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. Polycrystalline diamond, comprising:
   cubic diamond; and
   hexagonal diamond,
   a ratio of X-ray diffraction peak intensity of a (100) plane of said hexagonal diamond to X-ray diffraction peak intensity for a (111) plane of said cubic diamond being not lower than 0.01% and not higher than 0.5%.

2. The polycrystalline diamond according to claim 1, having rupture strength in a temperature range not lower than 800° C. and not higher than 1200° C., wherein the rupture strength in the temperature range not lower than 800° C. and not higher than 1200° C. is not lower than 90% of rupture strength at room temperature.

3. The polycrystalline diamond according to claim 2, having rupture strength in a temperature range not lower than 1000° C. and not higher than 1200° C., wherein the rupture strength in the temperature range not lower than 1000° C. and not higher than 1200° C. is higher than the rupture strength at room temperature.

4. The polycrystalline diamond according to claim 1, having hardness at 800° C., not lower than 80% of hardness at room temperature.

5. A scribe tool, comprising a tip end portion composed of the polycrystalline diamond according to claim 1,
   said tip end portion having three or four points.

6. A scribing wheel, comprising a wheel composed of the polycrystalline diamond according to claim 1.

7. A dresser, comprising a tip end portion composed of the polycrystalline diamond according to claim 1.

8. A wire drawing die, comprising the polycrystalline diamond according to claim 1.

9. A nozzle, comprising an orifice composed of the polycrystalline diamond according to claim 1.

10. A grinding tool, comprising a grinding edge composed of the polycrystalline diamond according to claim 1.

11. A cutting tool, comprising a cutting edge composed of the polycrystalline diamond according to claim 1.

12. A rotary cutting tool, comprising a cutting edge composed of the polycrystalline diamond according to claim 1.

13. A wire guide, composed of the polycrystalline diamond according to claim 1.

14. A method of manufacturing polycrystalline diamond according to claim 1, comprising the steps of: preparing a non-diamond carbon material having a degree of graphitization not higher than 0.58; and directly converting said non-diamond carbon material into cubic diamond and hexagonal diamond and sintering the non-diamond carbon material, without adding any of a sintering agent and a binder, under pressure and temperature conditions at which diamond is thermodynamically stable.

* * * * *